UNITED STATES PATENT OFFICE.

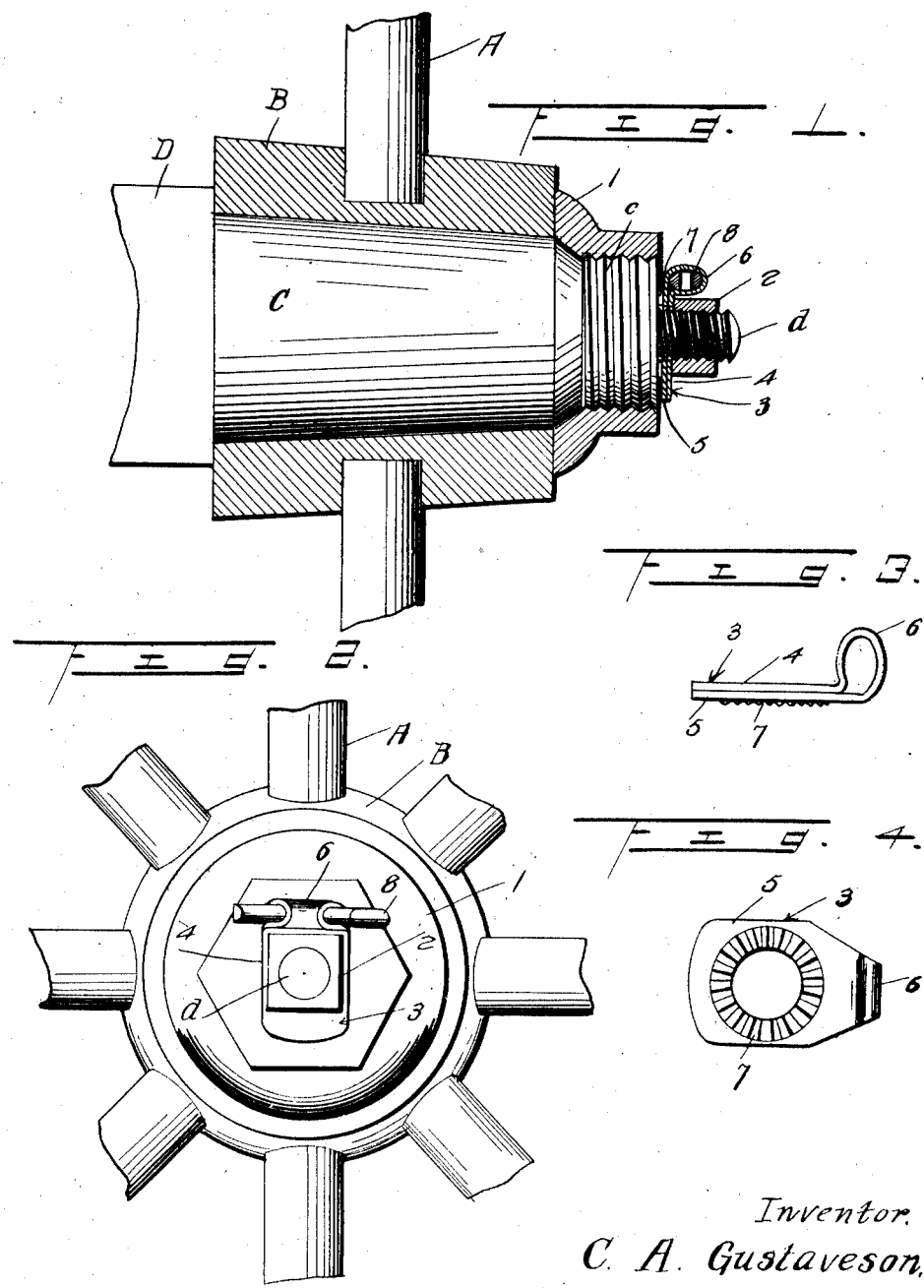

CLARENCE A. GUSTAVESON, OF WHITEWATER, WISCONSIN.

NUT-LOCK.

1,341,269.    Specification of Letters Patent.    Patented May 25, 1920.

Application filed August 19, 1919. Serial No. 318,485.

*To all whom it may concern:*

Be it known that I, CLARENCE A. GUSTAVESON, a citizen of the United States, residing at Whitewater, in the county of Walworth and State of Wisconsin, have invented certain new and useful Improvements in Nut-Locks; and I do hereby declare the following to be a full, clear, and exact description of the invention, such as will enable others skilled in the art to which it appertains to make and use the same.

This invention relates to nut locks, and more particularly to a nut lock specially adapted to be used in connection with wheel or axle nuts of wagons and similar vehicles.

One of the main objects of the invention is to provide a nut lock of the character stated of simple construction and operation which may be produced at small cost and may be readily applied to a wagon axle of standard construction. A further object is to provide a nut lock which will effectually prevent accidental detachment of the axle nut while permitting ready removal thereof when required. Further objects will appear from the detailed description.

In the drawings:

Figure 1 is a section through the hub of a wheel of conventional construction showing a locking device constructed in accordance with my invention applied.

Fig. 2 is a front view of the device as applied.

Fig. 3 is a side view of the locking member.

Fig. 4 is an underneath view of the locking member.

The wheel designated generally by A is provided with a hub B of any suitable or preferred construction which is rotatably mounted upon a spindle C of an axle D of known construction. The outer end portion of the spindle is exteriorly threaded as at *c* and is provided with a central reduced threaded stud *d*.

The threaded end portion of spindle C receives a flanged axle nut 1 of known type screwed thereon, the flange of this nut engaging the outer face of the hub for securing the same upon the spindle. A relatively small nut 2 is screwed upon stud *d*, and a locking member indicated generally by 3 is positioned between this nut and the outer end of the spindle. This locking member is formed from a suitable blank of sheet metal which is bent to provide two superposed plates 4 and 5 connected by a short sleeve 6. The inner plate 5 has its under face toothed or roughened as at 7, the teeth being preferably, though not necessarily, of substantial triangular form and so disposed as to permit rotation of the locking member with nut 2 in such direction as to screw the nut upon the stud, sleeve 6 engaging one wall of the nut so as to turn the locking member simultaneously with and similarly to the nut.

In practice, after axle nut 1 has been secured in position, locking member 3 is fitted over stud *d*, the plates 4 and 5 being provided with registering openings to accommodate the stud, after which nut 2 is screwed tightly into position so as to force the under plate 5 into tight engagement with the outer end of spindle C, the teeth 7, in the event that the spindle is formed of wood or other similar material, biting into the spindle so as to secure the locking member against reverse rotation. After this has been done, a cotter pin 8 is forced through sleeve 6 and spread so as to be secured therein. This cotter pin is of such size as to fit tightly through the sleeve so as to cause slight spreading thereof, thus tending to force the plates 4 and 5 apart so as to insure binding engagement between the locking member and the nut and the locking member and the spindle. The cotter pin 8 is of such size as to project in front of and be in engagement with the outer face of nut 1, thus effectually securing this nut against outward movement upon the spindle. In the event that nut 1 unscrews slightly upon the spindle, the pressure exerted by this nut will increase the pressure exerted upon sleeve 6 so as to more tightly secure the locking member in position and effectually prevent rotation of nut 2 thus preventing the axle nut from unscrewing off of the spindle to any appreciable extent. When it is desired to remove the axle nut, cotter pin 8 is removed from the sleeve thus releasing the axle nut which may be easily removed in the usual manner. After the spindle has been greased, in the event that the nut is removed for greasing the spindle, the nut and the cotter pin may be again secured in operative position in the manner described.

What I claim is:

1. In a nut lock, a threaded member having a reduced threaded element, a nut screwed upon said element, a locking member including two superposed plates interposed between said nut and the member carrying said threaded element, and means for forcing said plates apart so as to force the same into binding engagement with the nut and with said member carrying the threaded element.

2. In a nut lock, a threaded member provided with a reduced threaded stud, a nut screwed upon said stud, a locking member interposed between the nut and the member carrying the stud, said locking member including two superposed plates and a sleeve integrally connecting the same, and a member fitting tightly through said sleeve so as to exert a wedging effect thereon for spreading the plates apart and forcing them into tight binding engagement with said nut and the member carrying the stud.

3. In a nut lock, a spindle provided at one end with a reduced threaded stud, an axle nut screwed upon the end of the spindle, a nut screwed upon said stud, a locking member interposed between the end of the spindle and the second mentioned nut consisting of two superposed plates and a sleeve integrally connecting the same, and a member fitting tightly through said sleeve so as to exert a wedging effect thereon for spreading the plates, said member extending in front of the nut screwed upon the end of the spindle so as to prevent accidental unscrewing thereof.

4. In a nut lock, a spindle provided with a reduced threaded stud, a nut screwed upon said stud, a locking member including two superposed plates interposed between said nut and the spindle and a sleeve integrally connecting said plates and positioned to engage one side of the nut so as to prevent independent rotation thereof, and a member fitting tightly through said sleeve so as to exert a wedging effect thereon for spreading the plates apart.

In testimony whereof I affix my signature in presence of two witnesses.

CLARENCE A. GUSTAVESON.

Witnesses:
WALTER C. ROHDE,
G. M. FERRIS.